(12) United States Patent
Beckey et al.

(10) Patent No.: US 9,053,212 B2
(45) Date of Patent: Jun. 9, 2015

(54) MULTI-DIMENSIONAL METADATA IN RESEARCH RECORDKEEPING

(75) Inventors: Samuel S. Beckey, Rancho Santa Fe, CA (US); Joseph Fanelli, Escondido, CA (US)

(73) Assignee: Intelli-Services, Inc., San Ramon, CA (US)

( * ) Notice: Subject to any disclaimer, the term of this patent is extended or adjusted under 35 U.S.C. 154(b) by 926 days.

(21) Appl. No.: 12/187,336

(22) Filed: Aug. 6, 2008

(65) Prior Publication Data

US 2010/0036871 A1 Feb. 11, 2010

(51) Int. Cl.
  *G06F 7/00* (2006.01)
  *G06F 17/00* (2006.01)
  *G06F 17/30* (2006.01)
(52) U.S. Cl.
  CPC .... *G06F 17/30997* (2013.01); *G06F 17/30592* (2013.01)
(58) Field of Classification Search
  CPC .................................................. G06F 17/30286
  See application file for complete search history.

(56) References Cited

U.S. PATENT DOCUMENTS

| 7,155,466 | B2 * | 12/2006 | Rodriguez et al. | 707/694 |
|---|---|---|---|---|
| 7,606,795 | B2 * | 10/2009 | Hsu et al. | 1/1 |
| 7,702,639 | B2 * | 4/2010 | Stanley et al. | 707/999.1 |
| 7,793,099 | B2 * | 9/2010 | Peterson | 713/165 |
| 2002/0073043 | A1 * | 6/2002 | Herman et al. | 705/64 |
| 2002/0156756 | A1 * | 10/2002 | Stanley et al. | 706/47 |
| 2007/0130112 | A1 * | 6/2007 | Lin | 707/2 |

\* cited by examiner

*Primary Examiner* — Susan Chen
(74) *Attorney, Agent, or Firm* — Lewis Kohn & Walker LLP; David Kohn; Kari Moyer-Henry

(57) ABSTRACT

A system and method for facilitating data organization, for example in the organization of data in management of intellectual property records, is disclosed herein. Further, the present invention particularly provides a contextualization of information objects so that a full value of research and development (R&D) efforts can be accumulated by an organization. The system as disclosed herein collects information (raw) objects from a plurality of sources. Then, based on inferred context and user input, the system classifies each object in multiple dimensions according to needs of the application; and finally creates a high value, layer rich database embodying a context as well as a result to add value to a research process.

11 Claims, 4 Drawing Sheets

MULTI-DIMENSIONAL METADATA IN RESEARCH RECORDKEEPING

BACKGROUND OF THE INVENTION

1. Field of the Invention

The present invention pertains generally to an improvement in record keeping for scientific research. More specifically, the present invention pertains to systems and methods for memorializing data in research management and collection of intellectual property. The present invention in a preferred embodiment is particularly, but not exclusively, useful as a multidimensional metadata system and method in a laboratory research environment.

2. Description of the Prior Art

Research and development programs are designed to produce information. Gathering and using the information is a critical need to of all organizations that sponsor research and development (R&D).

Further, record keeping systems used to record intellectual property and manage research information are often developed with a specific purpose in mind. For example, timekeeping systems keep track of hours, protocol management systems maintain experimental procedures. Similarly, image databases hold images from microscopes, and laboratory notebooks are used to record a researcher's, contemporaneous thoughts, observations, and conclusions.

Recently, increasing computer computational power and data storage along with efficient searching capability has resulted in less need to selectively record information; indeed it is logical and appropriate in most circumstances to accurately retain all information indefinitely.

Accessing multiple systems and large amounts of information is often a burdensome task which requires intensive human involvement. Not only are the use of different systems and architectures a problem, but even when the information is on the same computer and in the same database, it is not always comparable and very easily accessible.

In a scientific environment, results are only meaningful if an experiment can be replicated. Unless all the relevant information is included in data records and indexed accordingly, results alone can be meaningless. The context of a result is as important as the result itself and without complete contextual information, data is often not reproducible.

Moreover, differing commercial needs from end users and application developers have promoted a situation where information is collected in islands. Vendors of software, equipment, and supplies have often provided databases that merely promote a single business use.

Database driven indexing methods are also partially to blame for poor recordkeeping. The use of non-sequential and non-unique indices, such as groupings by sets and subsets, non-alphabetically, semantically, and according to image characteristics is rare and difficult in research information management.

In light of the above, it is an object of the present invention to provide a framework to organize research and development information in a flexible and manageable way where the context of the information is as important as the information itself. It is still further an object of the present invention to provide a system for contextualizing information through a number of multidimensional metadata dimensions allowing data objects from a variety of sources to be incorporated in a truly enterprise wide research information infrastructure.

BRIEF SUMMARY OF THE INVENTION

The present invention specifically addresses and alleviates the above mentioned deficiencies, more specifically, the present invention is directed to a system for recording and management of data comprising: raw data objects, wherein the raw data objects are received and stored; processed data objects, wherein one or more dimensions are applied to the raw data objects to form the processed data objects, and wherein the dimensions represent information about the raw data object; and one or more metadata organizing models wherein the metadata organizing models together with the dimensions maximize a utility of the data at a later time providing a contextual space to the data object.

The system for recording and management of data is further characterized wherein the dimensions are indices in a relational database. Also, the invention is characterized wherein the one or more dimensions comprise: a continuum; a discrete model; a strict hierarchy; a soft hierarchy; a hashing; and a grouping.

The system for recording and management of data is additionally characterized wherein the one or more dimensions further comprise: a personnel responsible; a consumable media used; a physical location of the experiment; a protocol in effect; an instrument used; a disease or a research focus; a genus and a species of the sample; a reagent consumed; a time of an observation; a time consumed in an experiment; a lab notebook page; and a research program indicating a funding source.

The system for recording and management of data is still further characterized wherein each raw data object and each processed data object comprises XML (Extensible Markup Language), the system further comprising XML tags for each dimension. Additionally, raw data objects are automatically assigned appropriate dimensions based on a proximity in time, or other parameter, to a related other data object. Still further, the raw data objects are placed on appropriate dimensions based on an assistance of a user, a researcher, or a creator of intellectual property; and the raw data objects comprise a complex data object containing a database, according to a preferred embodiment.

The system for recording and management of data is still further characterized in that the processed data objects each comprise: hashing providing abbreviated indexing for providing an ease of lookup and comparison; encryption providing security and integrity of the processed data objects; a time stamp; and an electronic signature wherein the time stamp and electronic signature together provide for a validation and a proper evidentiary support in a legal process. Moreover, the system further comprises a system of software applications connected on a network of computers and data storage devices. Yet further, the system is characterized wherein a user is able to define and replace the dimensions according to needs of a particular application.

While the apparatus and method has or will be described for the sake of grammatical fluidity with functional explanations, it is to be expressly understood that the claims, unless expressly formulated under 35 USC 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Management of intellectual property, such as that which may be required in an enterprise performing research and development (R&D), or where an investigation is conducted in a forensic or legal setting, involves a collection and creation of units of information.

In a general sense, the present invention revolves around adding metadata to collected data objects 10. Data objects 10 herein refer to collected and received packets of information. They are typically objects selected from a variety of complex data types. For example, complex data types may be images, audio recordings, textual information, arrays of numeric data, output of instruments, or the product of algorithmic processing. The term metadata herein refers to "data about data" or the information that describes the data objects 10 which are collected.

Figure 1:
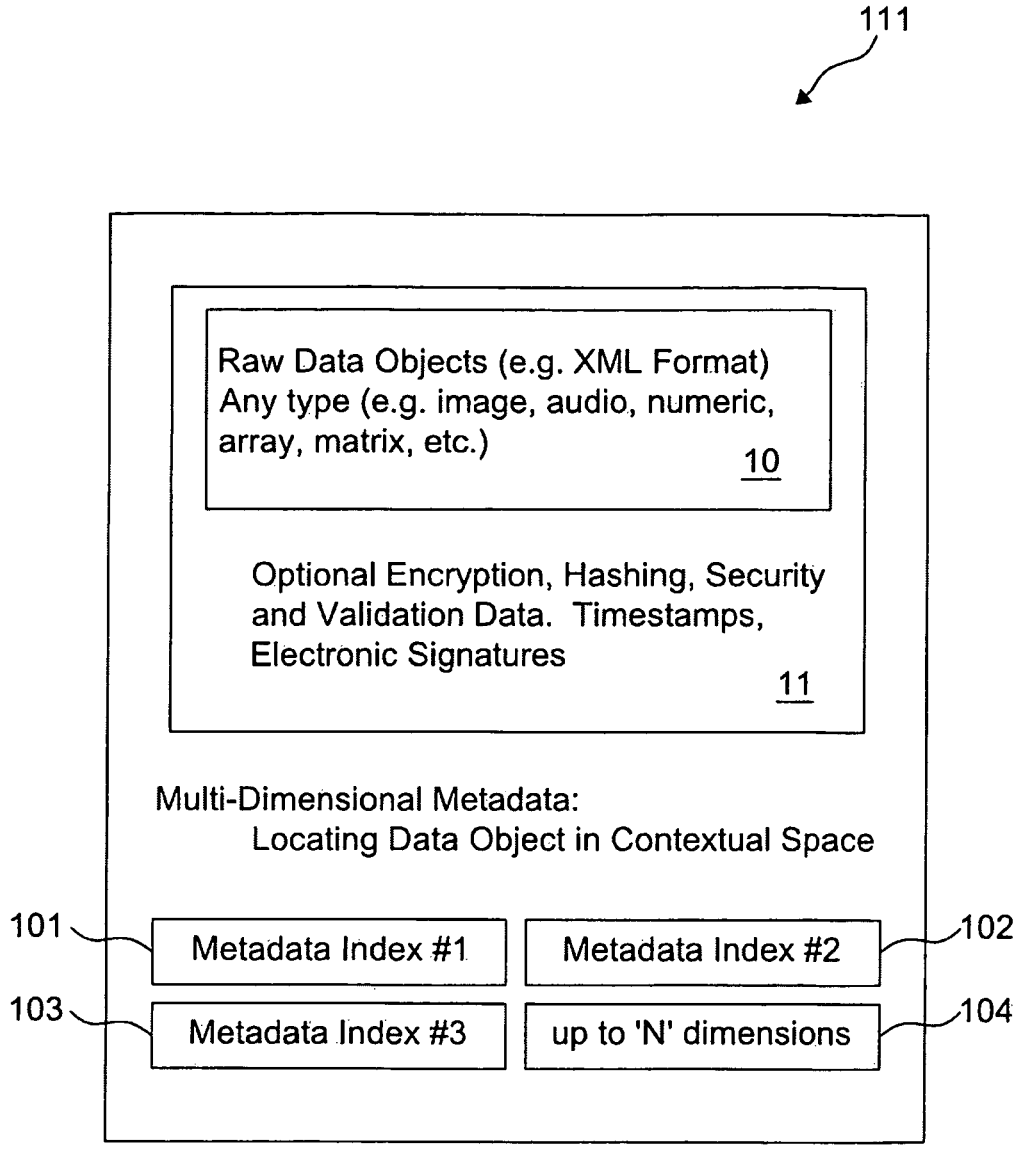
FIG. 1 is a schematical diagram of a raw data object as prepared and processed by a preferred system of the present invention.

Now turning to FIG. 1, a schematical representation of a raw data object 10 as prepared and processed 111 by system 100 (FIG. 3) is illustrated. Any data object 10 of any size can be accommodated. Typically an XML (Extensible Markup Language) format is used to provide maximum interoperability and associate each data item with its appropriate type. The data object 10 is a received piece of information generated by another software program, for example. It 10 can be any data type and is typically an image, audio recording, numeric value, array of numeric values, matrix or other data type. The subject invention is designed to handle any type, but does not necessarily need to interpret the contents of the data object 10.

Optionally, either originating before or during the processing 111 of the data object 10, it is possible to add encryption, hashing, security and validation data, time stamps, and electronic signatures 11. If this information 11 is provided or created by the subject invention, it is to be added as a external wrapper for the original data object 10.

Following receipt of the original data object 10, the process of assigning metadata 101, 102, 103, 104 information begins. The metadata 101, 102, 103, 104 defined for the data object 10 depends on the type of application. For example as discussed herein, an application may be that in laboratory management for the life sciences. On an abstract level, the application will define a plurality of metadata indices 101, 102, 103, 104 to be assigned to all data objects 10.

In many cases, the assignment of metadata indices 101, 102, 103, 104 will be able to be determined by software applications. Since the data is contextual, the application can be made aware of the context, and update context as conditions change. For example, some metadata indices 101, 102, 103, 104 will be determined by processing conditions, time of day, personnel logged in, or previous data objects 111 themselves.

A type of metadata will determine the underlying organizational principle for each metadata index. As the indices are defined 101, 102, 103, 104 they are either appended to the data object 10 through XML techniques, and/or entered as index fields 101', 102', 103' in a relational database 128. Such databases can contain both the processed data object 111, with all its auxiliary fields 11, and the metadata indices themselves.

Figure 2:
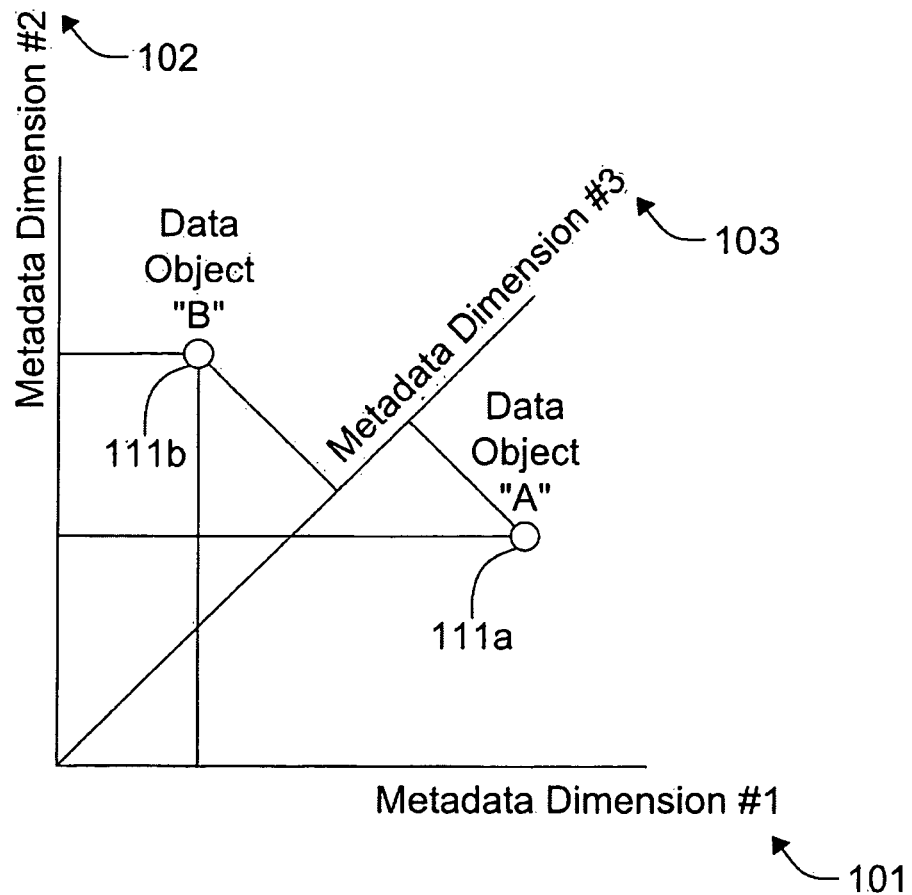
FIG. 2 is a graphical illustration of the conceptual process locating each data object in "N" dimensional space, shown here as three dimensions for clarity.

With reference to FIG. 2, and using three dimensions in this example, we see the data object 111a oriented visually in space. At this point there has been an assignment of metadata dimension 101, as well other the other two dimensions 102, 103. Later a second data object 111b is similarly oriented. Since the Metadata Indices are not the same as relational database indices (although they sometimes can be), there is no requirement to avoid overlap of data objects 111a,b in space, or to select a unique data object at each location.

The completed data object 111 contains within it the original source 10 information from the original application. For instance, if a microscope image or audio recording was the source of the data object 10, a file in native format (perhaps .jpg and .mp3 respectively) would be incorporated in the data object 10. Optionally, validation information 11 such as a hashing function (e.g. SHA-1), signature, and security information should be included. The metadata indices themselves are also included so that the exported data object retains its context and can be re-imported to the same location in 'N' dimensional space 104.

Figure 3:
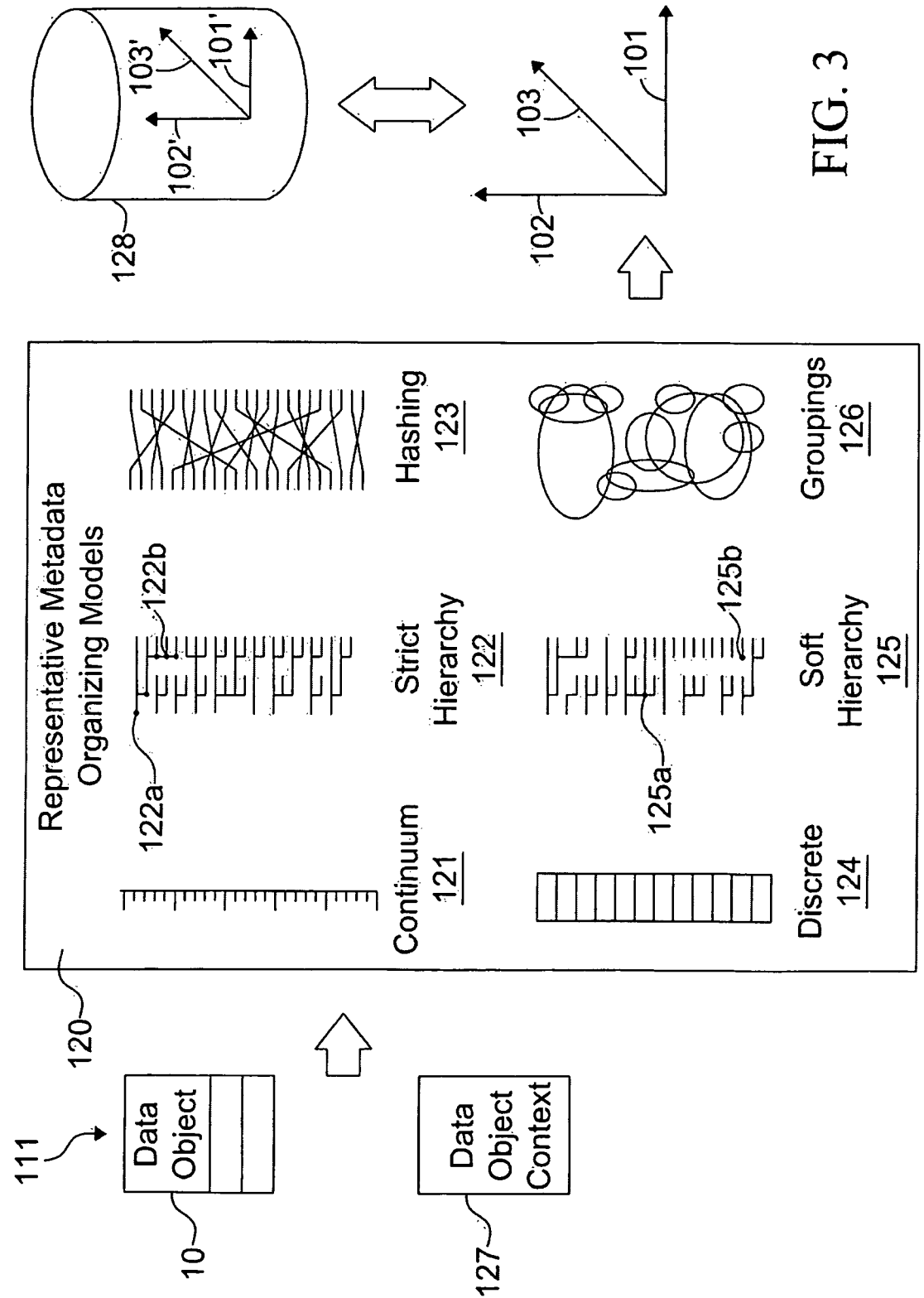
FIG. 3 is a schematical illustration of a series of metadata organizing models which can be selected and used to position each data object in multidimensional space.

With reference to FIG. 3, a preferred embodiment uses three phases to move a data object 111 from its source 10 to its location and storage in the 'N' dimensional space 101-104. The phases are $1^{st}$, accept the processed data object 111 and derive its context 127, for each dimension 101, 102, 103, 104; $2^{nd}$ using the appropriate metadata organizing model 120 encode the dimension as a linear location along that axis 101-103. This is to be aided by a plurality of metadata organizing models 120 shown as examples 121-126. And $3^{rd}$, storage of the final data object 111 in 'N' dimensional space 101-104 using a relational 128 or object oriented database.

At an initial set up time, when a system embodying the invention is configured, the dimensions 101, 102, 103, 104 for the application will be established. An example application is provided herein. Many metadata organizing models 120 are possible. Set up involves defining the dimensions 101, 102, 103, 104, the metadata organizing model 120 for each dimension, and defining rules for the derivation of contextual information 127.

Since metadata organizing models 120 are not limited to traditional indices 101', 102', 103' in a relational database 128, they may be more complex, and possibly ambiguous from a database administration perspective. The models 120 provided herein are the basis of the applications that have been applied to this invention, but are not the only possibilities.

In a continuum model 121, it is assumed that the dimension may be defined as a continuous variable and represented as a floating point number. This would be the case when the dimension represents an infinitely variable amount. The best example is the continuous flow of time. Since time is a universally applicable dimension for recorded information we would expect it to be used in most if not all embodiments of this invention.

The Discrete Model 124 uses a finite number of discrete bins to locate a data object along one of its dimensions. This is similar to a unique integer index, but again is not required to select a single unique data object. Barcodes using numeric identification, as is commonly applied to inventory and warehouse management, are a typical example. The resulting index on the barcode dimension, using a discrete model would allow a plurality of data objects 111 to be associated with a single barcode, which is the desired outcome.

Hierarchical Models 122, 125 provide a powerful means of organizing many kinds of information in a parent-child (e.g. 122a-122b) type of relationship. These can be used to manage organizational charts for example. They also have good effect in creating data structures to represent version and revision control schemes in document management, managing recipes, protocols, and formulations in research applications, or a genus and species groupings in the life sciences. The implementation of these types of data is performed with external data structure outside of a simple linear table based relational database 128. A first lookup finds the location in a node table, and a primary data object 111 database is linked to that location.

A preferred embodiment defines strict 122 and loose 125 hierarchy separately, as their implementation is somewhat different. Strict hierarchy 122 requires all nodes to be connected to a single parent node (e.g. 122a), and prohibits loose nodes (e.g. 125b) that are not connected anywhere. Dimensions defined this way, for example, can represent locations and each location can be broken down into sublocations, any number of times.

Further, loose hierarchy 125 allows unconnected nodes 125b and nodes with perhaps multiple connections 125a. This model 125 is useful in less rigorous designs, or where physical reality will not allow for a strict hierarchy 122. An example would be the use of bottled reagents in a laboratory setting. An aliquot from one reagent bottle might need to be combined with a second, and then diluted with a third, which would yield a node with three parents. Protocol management is also a loose hierarchy 125, where the document defining steps in an experiment might be subject to revision (creating a new child node) or combined with another (creating multiple parents). Where research information is unknown, orphan nodes 125b (no parents) are required and the loose hierarchy model 125 can be used in this case.

Two additional models 123, 126 are discussed which may be less common. Other models can be accommodated in this invention, and are likely to be encountered in new applications. In Hashing 123, some information in the data object 111 is used to create an abbreviated representation of the object. This is useful in generating metadata indices 101, 102, 103, 104 from large, or complex data sets. An example might be a software signature derived from an image or recording. If the hashing function 123 is designed correctly, similar data objects 111 will create similar hash outputs, with the results that searching and indexing is how possible. Long passages of text can be processed in a similar manner. Hashing 11 is also used herein to provide a desired level of security for data object 10, ensuring that it has not been modified from receipt, however the hashing metadata index model is a different use of the same idea.

Still further, groupings 126 allow data objects 111 to be thought of as sets and subsets, as in a Venn diagram. Example applications encountered in life sciences applications include a definition of research targets (diseases) by types and categories. Another example is the grouping 126 of research outputs by type, as in microscope images, chromatograph measurements, audio annotations, mass spectrometry output, lab notebook pages, drawings and diagrams, and the like.

Deriving context 127 involves the use of information that is available to the system, or otherwise information that is contained in the current and related data objects 111, and occasionally input from a user. Further, it may be occasionally worthwhile to allow the system to require that the user provide missing contextual information before a data object 111 can be stored.

Additionally, data objects 111 not only need to be oriented according to multiple dimensions 101-104 they also can provide the orientation. Where, for example, protocols 135 only change occasionally, a new protocol record as a data object 135 will supply the protocol dimension 135 for subsequent objects. Similarly for personnel, and physical location, simple rules can be established that allow the contextualization of all received data objects 111. Where this is not possible, the system can make inquiries of the user, and provide powerful tools to assign metadata in each of the required dimensions 101-104.

EXAMPLE APPLICATION 400

Figure 4:
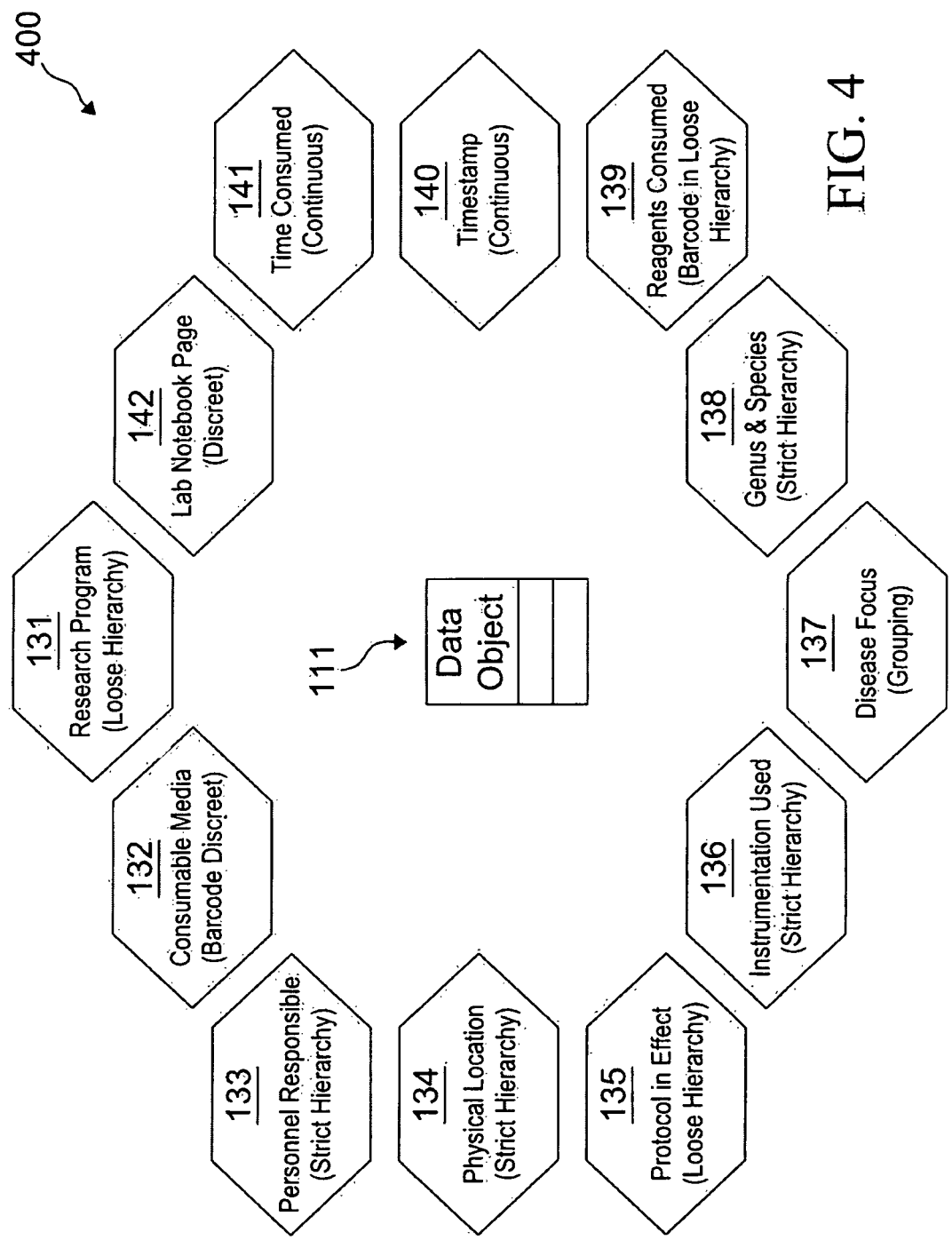
FIG. 4 is yet another schematical illustration of an application of the subject invention to a research and development (R&D) organization as typically seen in laboratories in the life sciences arts. This is only an example application to show the utility of the invention.

In FIG. 4, we provide an example 400 of the use of the invention in a a particular application. In the preferred embodiment 400, the system is being used to manage intellectual property created by R&D in a biological laboratory of a pharmaceutical company. In this environment, numerous systems already exist which create data objects 111. They may include physical systems such as paper based laboratory notebooks 142, as well as software applications. Recently, more and more instruments 136 are being integrated into a computing network, but information has not been optimally organized.

At an initial set-up, the dimensions 131-142 to be used were defined. It is desirable that new dimensions 104 can be added in the future. Along with the dimension, for which there can be an unlimited number, the set-up also defined the metadata model 120 to be used for each dimension 131-142, and a set of rules for deriving the context 127 of a data object in relation to each dimension.

In this environment, data objects 111 are continually received. In application, one or more software agents are used to collect these objects. Sometimes they appear as files in computer directories, sometime as serial information on the network or computer I/O ports, and sometime as database entries created by a dedicated software program.

New data objects 111 are processed by the system, converted to a unified XML format, oriented in the multiple contextual dimensions 131-142, and stored in a database (or group of databases in a remote mass storage device). A primary function of this invention is the orientation of the data object 111 in multidimensional space 131-142 according to the needs of the application.

Dimensions 131-142 in a biological research laboratory include, but are not limited to the following:

1. Research Program 131: the title of the research program, probably related to the funding authority in an accounting sense. Research programs 131 can be organized in the loose hierarchy model 125 so that subtasks and subprograms can be easily represented. Queries directed to a research program 131 can return all the subtasks accordingly.

2. Consumable Media 132: often used in large laboratories, particular media can be tracked. The media may be slides, plates, tubes, or various glassware. The purpose of tracking media is not necessarily related to the usage of the media itself, but is to identify a particular sample in an experiment. Barcodes are often available to uniquely identify media.

3. Personnel Responsible 133: the researcher can be identified, or numerous assistants to the researcher can be queried independently or as members of a team.

4. Physical Location 134: modeled as a strict hierarchy 122, the physical location can be assigned as geography-facility-lab-bench-drawer, in order of decreasing size. Location 134 can be defined as tightly as necessary, or as provided by ah inventory management system. Location 134 can further be associated with fixed laboratory equipment, or be independent for some instruments.

5. Protocol in Effect 135: the protocol for an experiment is extremely important in collecting enough information to make the experiment repeatable. Protocols are sometimes managed by separate software applications, as in work instructions, or Standard Operating Procedures (SOPs) in a validated environment. Where they 135 are so managed, a new or changed protocol can appear to the system as a data object 111.

6. Instrumentation Used 136: each instrument in the lab, whether a source of data objects 111 or not, has an identification and other parameters associated with it 136. In many cases calibration records are produced, and the state of the instrument is itself a source of a data object 111. Repeatable experiments may be related to the calibration and setup of the instrument 136, and these data objects may be recorded in this architecture.

7. Disease Focus 137: or research focus, this might be used to make information obtained in researching a particular disease comparable across experiments of across the enterprise. For example, an image from a slide might be classified as "blood diseases—hemophilia" using the grouping 126 capabilities, while the experiment itself might be related to cell counts.

8. Genus & Species 138: where a data object 111 is related to a sample obtained from a specific organism, this dimension allows it to be organized. A future query regarding the use of that species across many experiments can then be performed. For example: Report all Media Type: Slides where Disease Focus is "Blood Diseases" and Species is: Mouse; which would return images of blood diseases in mice across the entire enterprise.

9. Reagents 139: occasionally, supplies used in experiments need to be tracked, as in a recall, or to search for artifacts of a particular supplier. Software programs commonly exist which track such reagents and supplies, and perhaps automatically reorder when supplies are low. They also maintain inventories of supply closets, storage locations, and freezers. Data objects 111 may further comprise these transactions which can orient related and timely to other data objects 111 in this dimension 139.

10. Timestamp 140: a continuous dimension based on the time of origin of the data object 111.

11. Time Consumed 141: information based on the duration of processing in an instrument 136, or the time consumed in a time and attendance system for accounting purposes. Both allow the query of interesting information, for example: reporting all experiments involving a certain cell culture with less than a 200 hour incubation time; or how much time have we charged to experiments in a particular research program this month.

12. Laboratory Notebook Page 142: whether managed in a paper or electronic lab notebook, references to the researcher's notes and annotations are important. For a given researcher working under a specified protocol 135, the notebook page (scanned as an image) is a data object 111 that can orient many other data objects 111. The traditional Lab Notebook with pasted instrument outputs can be replaced with data objects where related data objects can be assigned, either automatically or manually to the notebook page.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

While the particular Multi-dimensional Metadata in Research Recordkeeping as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A system for recording and management of data comprising:
    a plurality of raw data objects, wherein the raw data objects are received and stored;
    a computer for processing the raw data objects;
    a plurality of processed data objects, wherein one or more dimensions are applied to the raw data objects to form the processed data objects, and wherein the dimensions represent information about the raw data object;
    the processed data objects each comprising:
    a hashing providing abbreviated indexing for providing an ease of look up and comparison;
        an encryption providing security and integrity of the processed data objects;
        a time stamp; and
    an electronic signature wherein the time stamp and electronic signature together provide for a validation and a proper evidentiary support in a graphical user interface/framework including options for recording and management of data, the options comprising:
        a. a continuum;
        b. a discrete model;
        c. a strict hierarchy;
        d. a soft hierarchy;
        e. a hashing; and
        f. a grouping
    and one or more metadata organizing models wherein the metadata organizing models together with the dimensions maximize a utility of the data at a later time providing a contextual space to the data object.

2. The system for recording and management of data of claim 1, wherein the dimensions are indices in a relational database.

3. The system for recording and management of data of claim 1, the one or more dimensions further comprising:
    a. a personnel responsible;
    b. a consumable media used;

c. a physical location of the experiment;
d. a protocol in effect;
e. an instrument used;
f. a disease or a research focus;
g. a genus and a species of a sample;
h. a reagent consumed;
i. a time of an observation;
j. a time consumed in an experiment;
k. a lab notebook page; and
l. a research program indicating a funding source.

4. The system for recording and management of data of claim 1, wherein each raw data object and each processed data object comprises XML (Extensible Markup Language), the system further comprising XML tags for each dimension.

5. The system for recording and management of data of claim 1, wherein raw data objects are automatically assigned appropriate dimensions based on a proximity in time, or other parameter, to a related other data object.

6. The system for recording and management of data of claim 1, wherein the raw data objects are placed on appropriate dimensions based on an assistance of a user, a researcher, or a creator of intellectual property.

7. The system for recording and management of data of claim 1, wherein the raw data objects comprise a complex data object containing a database.

8. The system for recording and management of data of claim 1, further comprising a system of software applications connected on a network of computers and data storage devices.

9. The system for recording and management of data of claim 1, wherein a user is able to define and replace the dimensions according to needs of a particular application.

10. A system for managing intellectual property created in a research and development laboratory, the system comprising:
   a plurality of raw data objects, the plurality of raw data objects having one or more dimensions associated therewith;
   a database to store the raw data objects; and
   a computer in electronic communication with the database, wherein the one or more dimensions comprising:
   a time of an observation;
   a time consumed in an experiment;
   a lab notebook page;
   a research program indicating a funding source, wherein the database further makes a record for creation and development of intellectual property; and
   an electronic signature wherein the time stamp and electronic signature together provide for a validation and a proper evidentiary support in a graphical user interface/framework including options for recording and management of data, the options comprising:
   a. a continuum;
   b. a discrete model;
   c. a strict hierarchy;
   d. a soft hierarchy;
   e. a hashing; and
   f. a grouping
   and one or more metadata organizing models wherein the metadata organizing models together with the dimensions maximize a utility of the data at a later time providing a contextual space to the data object.

11. The system for managing intellectual property created in a research and development laboratory of claim 10, the wherein the one or more dimensions further comprising:
   a consumable media used;
   a personnel responsible;
   a physical location of the experiment;
   a protocol in effect;
   an instrument used;
   a disease or a research focus;
   a species of a sample;
   a reagent consumed;
   a time of an observation;
   a time consumed in an experiment;
   a lab notebook page; and
   a research program indicating a funding source.

* * * * *